United States Patent [19]
Lee

[11] Patent Number: 5,175,776
[45] Date of Patent: Dec. 29, 1992

[54] OPTICAL FIBER SWITCH
[75] Inventor: Jerald D. Lee, Mendenhall, Pa.
[73] Assignee: BT & D Technologies Limited, Ipswich, England
[21] Appl. No.: 773,734
[22] Filed: Oct. 8, 1991

Related U.S. Application Data
[63] Continuation of Ser. No. 586,822, Sep. 24, 1990, abandoned.

[51] Int. Cl.⁵ .............................................. G02B 6/26
[52] U.S. Cl. .......................................... 385/16; 385/25
[58] Field of Search ............... 350/96.20, 96.21, 96.15; 385/16, 17, 22, 25, 57, 65, 83

[56] References Cited
U.S. PATENT DOCUMENTS

| | | | |
|---|---|---|---|
| 4,223,978 | 9/1980 | Kummer et al. | 350/96.2 |
| 4,261,638 | 4/1981 | Wagner | 350/96.2 |
| 4,337,995 | 7/1982 | Tanaka et al. | 350/96.2 |
| 4,407,562 | 10/1983 | Young | 350/96.2 |
| 4,415,229 | 11/1983 | McCullough | 350/96.2 |
| 4,699,457 | 10/1987 | Goodman | 350/96.2 |
| 4,759,597 | 7/1988 | Lemonde | 350/96.2 |
| 4,790,621 | 12/1988 | Calaby et al. | 350/96.2 |
| 4,834,488 | 5/1989 | Lee | 350/96.2 |
| 4,896,937 | 1/1990 | Kraetsch et al. | 385/16 |
| 4,911,520 | 3/1990 | Lee . | |
| 4,938,552 | 7/1990 | Jebens et al. | 385/16 |
| 4,946,236 | 8/1990 | Dautartas et al. | 385/17 |
| 4,946,247 | 8/1990 | Muska et al. | 385/16 |
| 4,948,223 | 8/1990 | Anderson et al. | 350/96.2 |
| 5,000,532 | 3/1991 | Kraetsch et al. | 385/16 |

Primary Examiner—John D. Lee
Assistant Examiner—Phan T. Heartney

[57] ABSTRACT

An optical fiber switch in which the switching force is applied directly to the fiber. A biasing force, generated by a bending of the fiber, is exerted on the fiber in a direction tending to urge the same toward the bottom of a first groove. The switching force is applied transversely to the direction of the biasing force, and moves the fiber out of the first groove and into a second, adjacent groove. When in the second groove, the biasing force on the fiber urges the same toward the bottom of the second groove.

20 Claims, 9 Drawing Sheets

OPTICAL FIBER SWITCH

This is a continuation, of application Ser. No. 07/586,822 filed Sep. 24, 1990, now abandoned.

BACKGROUND OF THE INVENTION

1. Field of the Invention

This invention relates to a switch for switching an optical fiber from a first to a second groove in response to a switching force and, in particular, to a switch in which the switching force is imposed directly on the fiber.

2. Description of the Prior Art

Fiber optic communication systems now use either single mode or multimode optical fiber cables to transmit information within a local area network. Switches permit optical paths within the network to be changed to allow for the information to be directed to a particular unit or units or even to bypass a particular unit. Switches for such uses must exhibit a high degree of reliability over many switch cycles, low insertion loss, low crosstalk, and short switch times.

Several forms of optical fiber switches are known. In some switch arrangements the switching function is accomplished by placing an optical device within the optical path. Copending application Ser. No. 07/452147, (ED-0385), filed Dec. 18, 1989 and assigned to the assignee of the present invention, now abandonment discloses the use of a movable blocking element to switch light from one fiber to another or to an off position. U.S. Pat. No. 4,790,621 (Calaby et al.) shows the use of a movable prism to switch light from one fiber to another. U.S. Pat. No. 4,261,638 (Wagner) discloses the use of a reflecting member to switch light along different optical paths.

Mechanical switching arrangements are also known. In such devices the optical fiber is fixedly mounted to a movable member and the member is physically displaced from a first to a second position to switch the optical path. U.S. Pat. No. 4,911,520 (Lee), also assigned to the assignee of the present invention, utilizes a cantilevered glass tongue to which a fiber is edgewise mounted. A first and a second fiber are similarly mounted along edges of a fixed block. Moving the glass member from a first to a second position removes the fiber thereon from a first optical path that includes the first fixed fiber and places the fiber into a second optical path that includes the other fixed fiber.

In U.S. Pat. No. 4,407,562 (Young) optical fibers are secured in grooves disposed on the exterior surface of a movable housing. Displacement of the housing brings the faces of the fibers into and out of alignment with other arrays of fibers thereby to cause the switching action. Alignment of the movable housing with the casing in which it is disposed is effected using alignment grooves. U.S. Pat. No. 4,896,937 (Kraetsch et al.) provides two V-grooves, one in the cover and another in the base of a the housing. The switching action is accomplished by moving a ferromagnetic strip to which a fiber is attached into position in one of the V-grooves.

U.S. Pat. No. 4,759,597 (Lemonde) mounts an optical fiber to a magnetic rocker arm. The pivotal motion of the rocker arm moves the fiber between corresponding fibers secured in grooves respectively provided in an upper and a lower support slab.

In the above discussed mechanical switches the switching action is accomplished by moving, in addition to the mass of an actuating element, a member to which the fiber is attached. That member is relatively large and massive as compared to the size and weight of the optical fiber. These devices would thus appear to be limited in their switching speed.

U.S. Pat. No. 4,946,236 (Dautartas et al.) discloses a switch in which the displacing force is applied to the fiber itself. The switch includes fibers that are surrounded by a magnetic sleeve. The fibers are disposed within grooves defined by the corners of an elongated, diamond shaped, internal channel extending through a block. A magnetic field is applied to effect the displacement of the fibers from one corner of the groove to another.

In view of the foregoing it is believed advantageous to provide an optical fiber switch having a repeatably low insertion loss, a relatively short switching time in which the switching action is accomplished by moving (in addition to the mass of the actuating element) only the relatively minimal mass of the fiber.

SUMMARY OF THE INVENTION

The present invention relates to an optical fiber switch comprising a base having a block portion thereon. The block has a surface in which at least a first and a second groove are formed. An optical fiber has a first predetermined portion of its length adjacent to its end face received in one of the grooves. The axis of the fiber in this first predetermined portion thereof defines a predetermined positive angle with respect to the axis of the groove. The fiber is biased by a biasing force acting on the optical fiber in a direction which urges the first predetermined portion of the fiber toward the bottom of the groove. A second predetermined portion of the fiber spaced behind the first portion is mounted over an inclined ramp, thereby bending the portion of the fiber forwardly thereof. The biasing force is generated by the bending of the fiber. Preferably the surface of the ramp defines an angle with respect to the base that lies in a range from five (5) to fifteen (15) degrees. The ramp may be grooved, if desired.

A switching member is reciprocally movable with respect to the base from a first to a second position. The motion of the switching member is generally transverse to the direction of the biasing force. During its movement the switching member engages operatively against the fiber thereby to move the first predetermined portion thereof against the biasing force out of the one groove and into the other groove. As the fiber is displaced the biasing force acts thereupon to urge the first predetermined portion of the fiber toward the bottom of that other groove. In the preferred instance the switching member takes the form of a yoke connected via a rocker arrangement to an actuating solenoid. The yoke engages operatively against an intermediate portion of the fiber disposed between the ramp and grooved block.

A switch embodying the teachings of the present invention may be used in any one of several switching environments, such as a one-by-two switch, a two-by-two switch, or a crossover switch.

BRIEF DESCRIPTION OF THE DRAWINGS

The invention may be more fully understood from the following detailed description thereof, taken in connection with the accompanying drawings, which form a part of this application, and in which:

FIG. 1D is a side elevation view of the switch shown in FIG. 1A with a portion thereof broken away, while FIG. 1E is an enlarged view of a portion FIG. 1D;

FIG. 2A is a view generally similar to FIG. 1A of a portion of the switch there shown illustrating the extension of the principles of the switch in accordance with the present invention to an environment for switching multiple optical fibers, the switch being shown with the switching member in a first position and the movable fibers shown as each occupying a first groove, while

DETAILED DESCRIPTION OF THE INVENTION

Throughout the following detailed description, similar reference numerals refer to similar elements in all Figures of the drawings.

The various subparts of FIG. 1 (viz., FIGS. 1A through 1F) are highly stylized diagrammatic views of the basic elements of a switch 10 in accordance with the present invention. Although more detailed drawings of the structure of the switch 10 are presented hereinafter, the various views comprising FIG. 1 are useful in clearly indicating the basic structure and operation of the switch 10.

The switch 10 is operative to switch at least one optical fiber 12 from a first position to at least a second position. In one and/or both positions, the fiber 12 may be arranged to optically communicate with a fixed optical fiber $F_1$ or $F_2$, as will be developed.

The movable fiber 12 may be either a single or a multimode optical fiber and is typically fabricated of fused silica or plastic. The fiber 12 has a predetermined diameter D. The fiber 12 is illustrated in FIGS. 1A, 1B, 1D, 1E and 1F with the jacket thereof removed. Accordingly the diameter D represents the diameter of the fiber core plus its surrounding cladding. This diameter D, for a single mode fiber, is typically on the order of one hundred twenty five (125) micrometers.

Figure 1A:
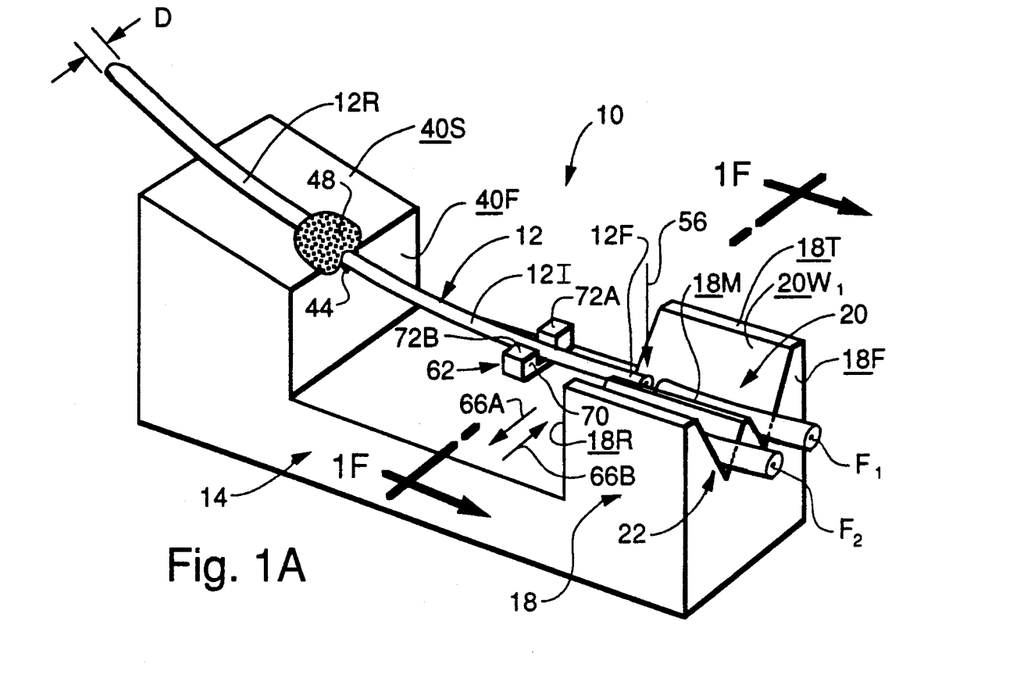
FIG. 1A is a stylized perspective view of the elements of an optical fiber switch in accordance with the present invention from which the principles of operation thereof may be understood, the switching member being illustrated in a first position and the fiber being illustrated as resident in a first groove.
Figure 1B:
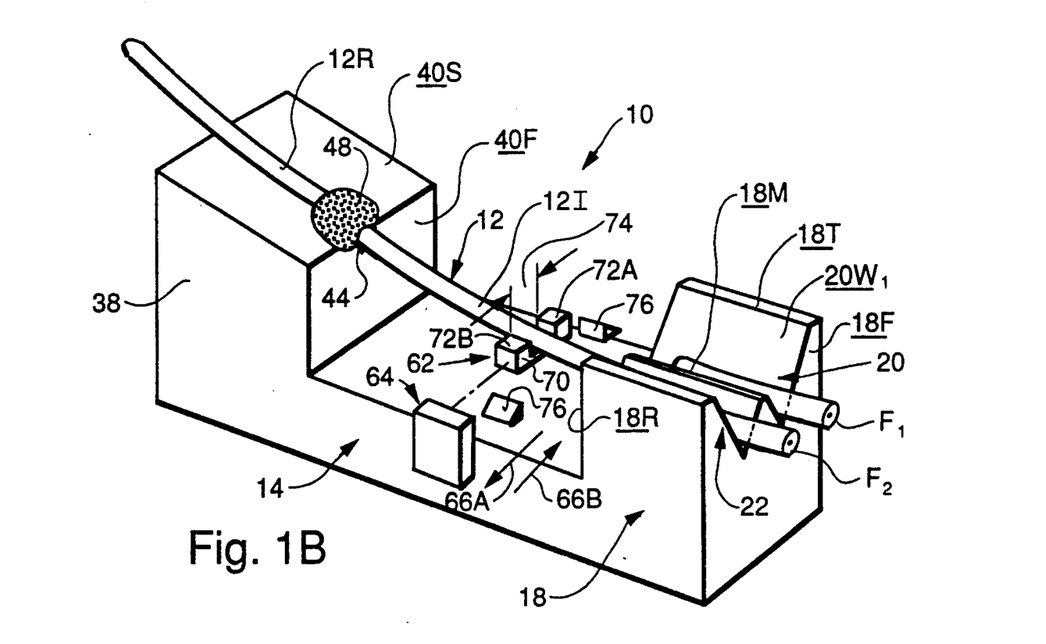
FIG. 1B is a view similar to FIG. 1A with the switching member being illustrated in a second position and the fiber being illustrated as resident in a second groove.

The switch 10 includes a base 14 and a corresponding cover 16. The cover 16, illustrated only schematically in FIG. 1D is arranged in any convenient fashion for conjointure with the base 14. When joined to the base 14 the cover serves to enclose and thereby protect the elements of the switch 10.

The base 14 includes a block portion 18 located at a forward portion thereof. The block 18 may be mounted on and secured to the base 14, or may be formed integrally therewith, as shown. The block 18 has a top surface 18T, a front surface 18F, and a rear surface 18R. The axial length of the block 18 is indicated by the reference character 18L (FIG. 1D).

The top surface 18T has at least a respective first and a second open groove 20, 22, respectively, formed therein. The grooves 20, 22 interrupt at least the rear surface 18R of the block 18 and extend axially along the block 18 for some predetermined axial distance. In most instances the grooves 20, 22 extend across the entire axial length 18L of the block 18 and thus also interrupt the front surface 18F thereof. A planar median 18M may be defined between the adjacent grooves 20, 22, if desired.

In the preferred instance the grooves 20, 22 are each generally V-shaped, with the sidewalls $20W_1$, $20W_2$ and $22W_1$, $22W_2$, as the case may be, of each groove tapering toward a pointed bottom 20B, 22B, respectively. The grooves 20, 22 each have an axis 20A, 22A, respectively, extending therethrough. The respective axis 20A, 22A of each groove 20, 22 is collinear with the bottom thereof.

As is apparent from the Figures one sidewall of the groove adjacent each lateral extremity of the switch 10 extends a greater distance above the sidewalls of the grooves defined intermediate therebetween. Thus, in the context of the embodiment of FIG. 1 the sidewall $20W_1$ and the sidewall $22W_2$ extend above the intermediate sidewalls $20W_2$ and $22W_1$.

As will become more apparent herein, in accordance with the present invention, the precise location of the fiber 12 when the same is in each respective groove thereof is accomplished by the interaction of the fiber with the groove. With a V-shaped groove at least two point contact must be defined between the sidewalls of the grooves and the fiber for precise alignment of the fiber.

The bottoms 20B, 22B of the grooves 20, 22 each extend at least a predetermined depth into the block 18. Generally speaking, the grooves 20, 22 must extend to a depth so that the fiber is precisely aligned as a result of at least two point contact with the sidewalls of the grooves. Thus, in practice, for a multiple movable fiber switch using ninety degree V-grooves, the grooves should extend into the block for a distance approximately equal to the radius of the fiber 12. In the case of a single movable fiber, as illustrated in FIG. 1, the depth 30 (FIG. 1F) may be on the order of the fiber diameter D. Although it is not required, in practice, the depth dimension should be the same for all the grooves.

Figure 1C:
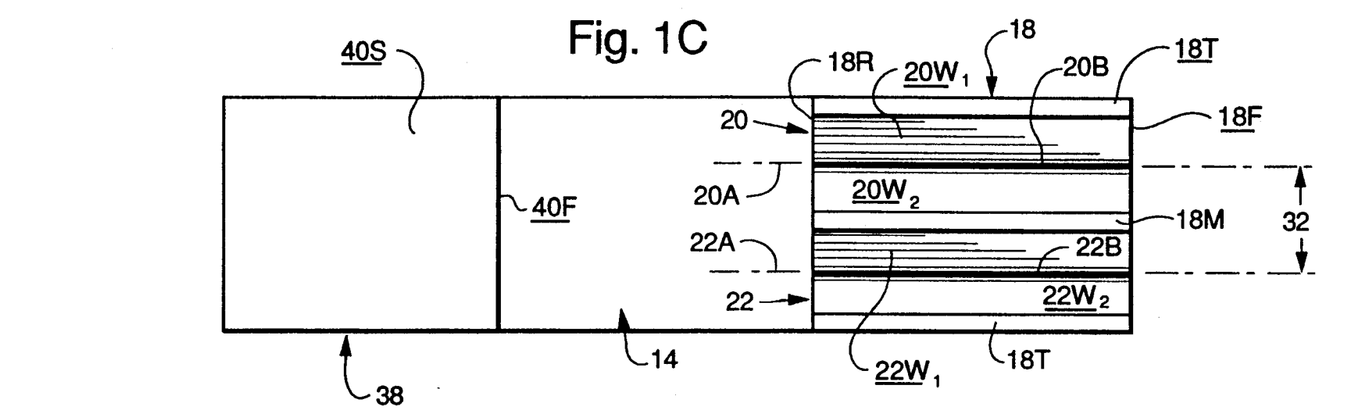
FIG. 1C is a plan view of the switch shown in FIGS. 1A and 1B, with the fiber being removed therefrom for clarity of illustration.
Figure 1D:
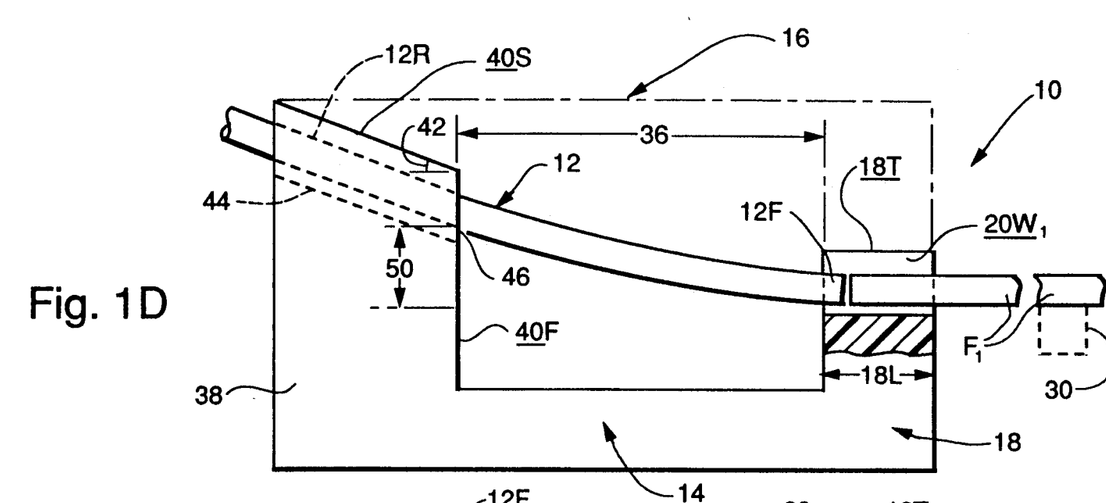
Figure 4A:
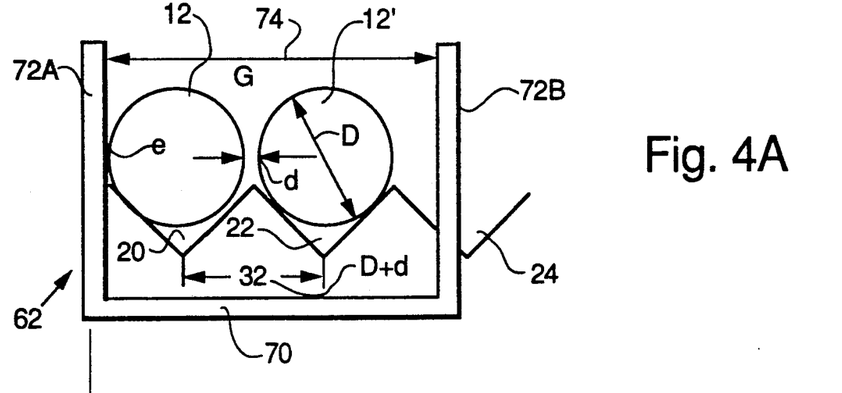
FIGS. 4A through 4C are diagrammatic views that illustrate the minimum spacing required between the arms of the yoke of the switching member for a two fiber switch as illustrated in FIG. 2.

In the preferred case, best seen in FIG. 1C, the axes 20A, 22A of the grooves 20, 22 are parallel and are separated from each other by a distance 32 which is at least slightly larger than the diameter D of the fiber 12, thereby to prevent their touching as they repose in the grooves. Although a more precise definition of the spacing 32 of the grooves is set out hereinafter (FIG. 4), it should be noted that in the case of a single movable fiber (FIG. 1) the magnitude of the separation distance 32 is not as critical as in the case of plural movable fibers. It lies within the contemplation of the present invention to arrange the axes 20A, 22A of the grooves 20, 22 such that they subtend a predetermined angle (on the order of one degree) therebetween.

The fiber 12 has an end face 12E (FIG. 1E), preferably defined by cleaving the fiber 12. In practice, a suitable anti-reflection coating, such as a one-quarter wavelength thick layer of magnesium flouride, is provided on the end face 12E.

The fiber 12 has a first predetermined portion 12F (perhaps best seen in FIGS. 1D and 1E) defined adjacent to the end face 12E thereof while a second predetermined portion 12R (perhaps best seen in FIG. 1D) is defined a predetermined distance rearwardly from the first portion 12F. The first portion 12F of the fiber 12 may be viewed as that portion of the fiber 12 extending between the rear surface 18R of the block 18 and the end face 12E. The first portion 12F of the fiber 12 has a central axis 12A (FIG. 1E) extending therethrough.

In the embodiment shown in FIG. 1, two stationary optical fibers $F_1$, $F_2$ are fixed in a manner such that they remain in place in a respective V-grooves 20, 22. For example, the stationary fibers $F_1$, $F_2$ may be secured to another block 30 (indicated in dot-dash lines in FIG. 1D) using a ultraviolet light curable resin such as that sold by Dymax Corporation, Torrington Conn. as Dymax 305. Another suitable adhesive is that sold by Electro-Lite Corporation, Danbury, Conn. under the product number 82001-ELC-4480. The portion of the fixed fibers extending into the grooves 20, 22 is also secured into the block 18, with care being exercised to prevent the adhesive from reaching the region of the grooves into which the movable fibers are disposed. The block 30 may be mounted on or formed integrally with the base 14. The cleaved end faces of the fibers $F_1$, $F_2$ may be provided with anti-reflection coatings, such as that discussed above. Of course, it should be understood that if a simpler on-off switch arrangement is desired, one of the fixed fibers $F_1$ or $F_2$ may be omitted.

In a first switch position (FIG. 1A) the first predetermined portion 12F of the fiber 12 is received within a first one of the grooves 20, 22, as the case may be. Although not completely visible from FIG. 1B, in the second switch position the same predetermined portion 12F of the fiber 12 is received within the other of the grooves 20, 22. When in each switched position the end face 12E of the movable fiber 12 lies within a predetermined close distance 34 (FIG. 1E) of the end face of the fixed fiber $F_1$, $F_2$ (as the case may be) disposed in that groove.

In the embodiments of the invention shown herein the first portion 12F of each movable fiber 12 has an axial dimension such that, when the fiber is in any switch position, the end face 12E of the fiber lies within a groove, intermediate the surfaces 18F and 18R of the block 18. The first portion 12F of the fiber 12 has an axial length typically between 0.25 millimeters and 0.40 millimeters when the axial length 18L of the block is on the order of 1.5 millimeters. The gap 34 is on the order of approximately sixty-five (65) micrometers.

It should be understood, however, that the first portion 12F of the fiber 12 may have an axial length such that, when the fiber is in either switch position, the end face 12E of the fiber 12 and some region of the first portion 12F projects from the groove in which it is disposed beyond the face 18F of the block 18. The projecting end 12E of the fiber 12 may be placed in optical communication with either another fiber or with any active or passive opto-electronic device. The hypothetical fiber or the hypothetical opto-electronic device is suitably supported by any convenient expedient. The support arrangement for the fiber or the device may be attached to or made integral with the base 14. As a yet further alternative, it should be understood that the first portion 12F of the fiber 12 may have an axial length such that, when the fiber is in either switch position, the end face 12E of the fiber lies coplanar with the surface 18F of the block 18. In such an arrangement either the hypothetical optical fiber or the hypothetical opto-electronic device may be secured to the surface 18F of the block 18, either directly or by a suitable mounting arrangement.

Secured to the base 14 a predetermined distance 36 (FIG. 1D) from the block 18 is a support pedestal 38. The support pedestal 38 may be mounted on and secured to the base 14 or may be formed integrally therewith, as is illustrated. The support pedestal 38 has a generally inclined ramp surface 40R and a frontal surface 40F thereon. As will be discussed the ramp surface 40R serves to develop a biasing force in the fiber 12. This function is best served if the ramp surface 40S is inclined at a predetermined angle 42, measured as shown in FIG. 1D. In practice the angle 42 lies in the range from five (5) to fifteen (15) degrees.

The second predetermined portion 12R of the movable fiber 12 extends over the ramp surface 40S. The ramp surface 40S may be provided with a groove 44 in which the second portion 12R of the fiber 12 is received. In either event the contact point at which the fiber 12 last touches the frontal surface 40F of the pedestal 38 is indicated by the reference character 46. The portion of the fiber 12 extending past the contact point 46 to the end face 12E is termed the "free length" of the fiber.

The fiber 12 is secured in the groove 44 (or on the ramp surface 40S of the pedestal) at least in the vicinity of the contact point 46. Any suitable expedient, such as one of the adhesives mentioned earlier, may be used. The adhesive is indicated by the reference character 48 (FIGS. 1A and 1B).

As is best illustrated in FIG. 1D the contact point 46 lies a predetermined offset distance 50 above the bottom of the grooves 20, 22. The axis 12A of the portion 12F of the fiber 12 defines a predetermined angle 52 (FIG. 1E) with respect to the axis 20A, 22A (as appropriate) of the groove 20, 22. The angle 52 must be positive (i.e., above a reference plane P that is disposed parallel to the surface of the base 14 and includes the axis of the groove) and is related to the clearance distance 36, the offset distance 50 and the pedestal angle 42 in accordance with the small angle approximation (in radians):

$$A = B - 1.5(B - H/L),$$

with

A representing the angle 52,
B representing the angle 42,
H representing the offset distance 50, and
L representing the clearance distance 36.

In practice, the angle 52 is on the order of one (1) degree.

As seen from FIG. 1D, the axes of the fixed fibers $F_1$, $F_2$ are arranged parallel to the axis of the groove in which they are disposed. However, it should be understood that the axes of the fixed fibers $F_1$, $F_2$ may also be inclined with respect to the axis of the grooves, similar to the inclination of the movable fiber 12. This condition is suggested in FIG. 1E. To this end, it may be desirable to slightly incline the block 30 (FIG. 1D) in order to cause a bending in the fibers and thereby to obtain a biasing force thereon similar to the biasing force 56 imposed on the movable fibers, as will be discussed. This alternative arrangement eliminates the adhesive attachment of the fixed fibers in the grooves of the block 18.

Owing to the disposition of the first portion 12F in the groove 20, 22 and the second portion 12R on the ramp surface 40S (including being disposed in the groove 44 therein) the fiber 12 bends throughout its free length with the curvature being largest closer to the pedestal 38. This bending of the fiber 12 serves to impose a biasing force acting on the first portion 12F thereof. The biasing force acts in a direction 56 urging the first portion 12F of the fiber 12 toward the bottom of the respective groove in which it is disposed. The biasing force thus acts in a direction 56 that is oriented generally perpendicularly to the top surface 18T of the block 18.

A switching member, diagrammatically indicated by the reference character 62, is operatively connected (FIG. 1B) to an actuator 64 for reciprocating movement with respect to the base 14 in opposed directions 66A, 66B. The reciprocating motion of the switching member 62 in the directions 66A, 66B is in a direction generally transverse to the direction 56 of the biasing force and to the axis of the grooves 20, 22. The switching member 62 is disposed in the clearance space 36 provided between the block 18 and the pedestal 38, preferably as close to the rear surface 18R of the block 18 as possible. Structural details of the preferred form of the switching member 62 and the actuator 64 are set forth hereinafter.

In general, the switching member 62 takes the form of a yoke having a crossbar 70 and a first and a second arm 72A, 72B thereon. The arms 72A, 72B are spaced apart a distance 74 sufficient to accept and to act against a portion of the intermediate region 12I of the fiber 12, that is, the region of the fiber intermediate the pedestal 38 and the block 18. The spacing 74 is such that the arms 72A, 72B do not contact the fiber, other than when imparting a switching force thereto. A more precise definition of the spacing 74 between the arms 72A, 72B as well as a discussion of the distance of travel of the switching yoke 62 is given hereinafter.

The motion of the switching yoke 62 is limited by a suitable abutment arrangement, also to be described, diagrammatically illustrated in FIG. 1B by the reference character 76. As will be discussed the abutment arrangement 76 needs to be only coarsely aligned inasmuch as it is not responsible for precise alignment of the optical fiber. As noted, precise alignment of the fiber is accomplished by the V-grooves.

Figure 1F:
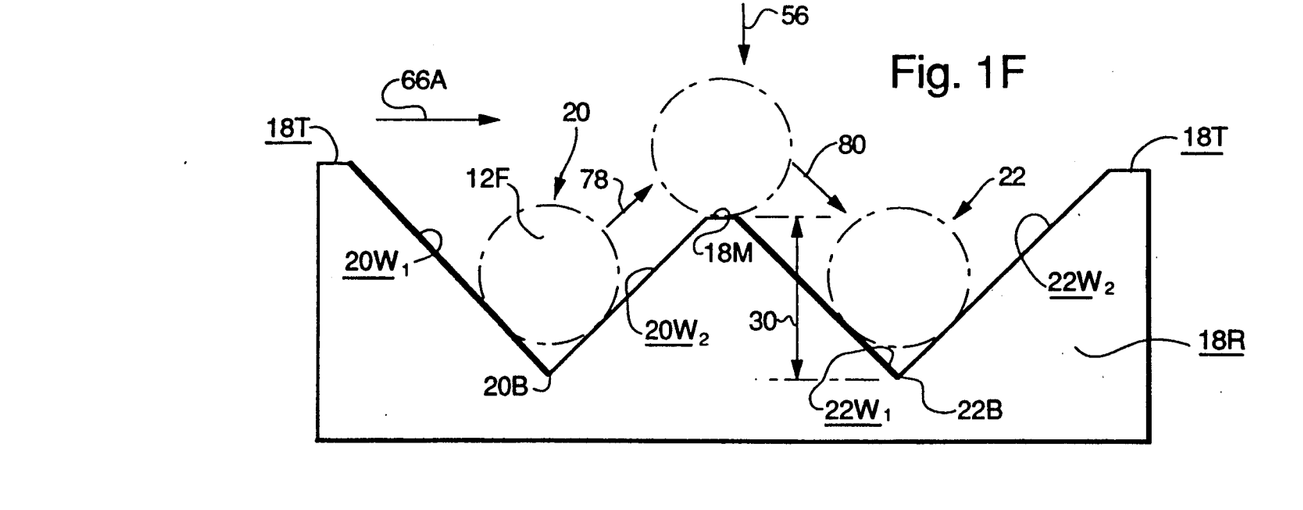
FIG. 1F is an elevation view taken along lines 1F—1F in FIG. 1A.

With reference to FIGS. 1A, 1B and 1F, the switching action of the switch 10 of the present invention may be more fully understood. With the first portion 12F of the fiber 12 disposed in the first groove 20, the switching member 62 is displaced by the actuator 64 in an initial direction 66A. The arm 72A is thus brought into engagement with the portion of the intermediate region 12I of the fiber 12 lying close to the block 18. The switching force is thus transferred by the arm 72A to the fiber 12.

As may be better appreciated from FIG. 1F the camming reaction between the sidewall 20W₂ of the groove 20 and the first portion 12F of the fiber 12 causes the same to be lifted out of the first groove 20. The lifting motion is indicated by the character 78 and occurs against the action of the biasing force 56. Continued motion of the switching member 62 in the direction 66A causes the fiber 12 to transverse the median 18M (if provided) and brings the first portion 12F of the fiber 12 into the mouth of the other groove 22. The biasing force acting in the direction 56 urges the portion 12F of the fiber 12 toward the bottom 22B of the other groove 22. This motion is indicated by the character 80.

As may be appreciated from the foregoing the end 12E of the fiber 12 thereby travels along a generally semicircular path from its position of repose in the first groove 20 (FIG. 1A) to its position of repose in the second groove 22 (FIG. 1B). The ratcheting motion caused by the re-seating of the biased fiber 12 into the bottom of the adjacent groove as the fiber 12 is traversed across the block 18 provides a detent action that positively places the fiber into a succeeding groove. The alignment of the fiber 12 when in either the first or the second (and any subsequent) positions is, as noted, imparted by the sidewalls acting against the fiber 12. Of course, the motion of the switching member 62 in the reverse direction 66B reverses the switching of the fiber 12 from the groove 22 to the groove 20 in an analagous manner. In each case the abutment arrangement 76 limits the range of motion of the switching member 62.

It is apparent from the foregoing that, in accordance with this invention, the switching force is transmitted by the switching member 62 directly to the fiber 12. This circumstance is to be distinguished from the mechanical switch arrangements of the prior art in which the switching force is applied to the member on which the fiber is attached. Since only the mass of the actuator and the relatively less massive fiber is being displaced, the switching action in accordance with the present invention may be effected with relatively high switching speed, on the order of about two milliseconds.

To facilitate the motions of the discussed in FIG. 1F the free length of the fiber, the angle 42 of the ramp surface 40S, and the offset distance 50 must be sized to provide sufficient force to overcome friction between the fused silica optical fiber and the material of the block 18 without breaking or cracking the optical fiber under bending stress. In the preferred embodiment it has been found that if the free length is about 1.4 centimeters, the offset distance 50 should be about 0.066 centimeters above the V-groove when the angle 42 of the ramp is about ten (10) degrees.

It should be readily appreciated from the foregoing that more than two grooves may be disposed in the block 18 and that the fiber 12 may be switched to any selected one of the grooves depending upon the magnitude of the displacement of the switching member 62. Moreover, it should also be understood that the principles of the present invention may be extended to switch arrangements having more than one movable fiber therein. Accordingly, attention is now invited to the switch arrangements shown in FIGS. 2 and 3.

Figure 2A:
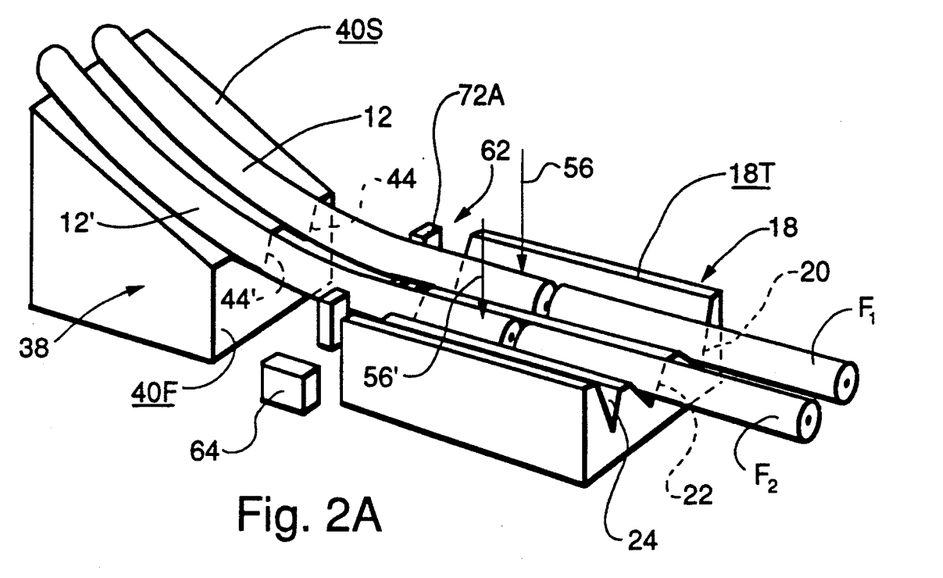
Figure 2B:
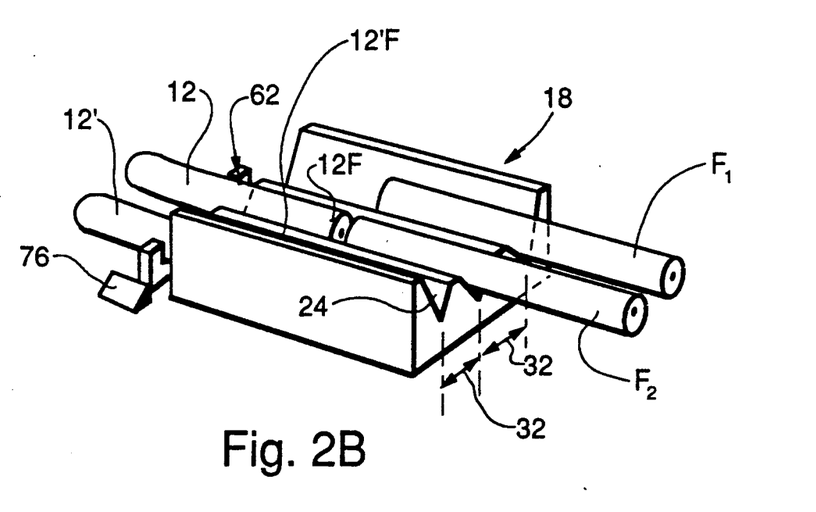
FIG. 2B is a view similar to FIG. 2A with the switching member in a second position and the movable fibers each being switched into a second groove.

In the embodiment of FIGS. 2A and 2B the block 18 has three V-shaped grooves 20, 22, and 24 provided therein. The axes of the grooves 20, 22 and 22 are each spaced apart a distance 32 that is on the order of the diameter D of the movable fibers 12, 12'. Two stationary optical fibers $F_1$, $F_2$ are again fixed so as to remain in place in two of the V-grooves 20, 22. Two movable optical fibers 12, 12' are mounted on the ramp surface 40S of the support pedestal 38 (not shown in FIG. 2B)

in respective grooves 44, 44' thereon. The fibers 12, 12' are thus each bent and, in the manner discussed in connection with FIG. 1, a biasing force 56, 56' is thereby generated urging the first portion 12F, 12F' of each of the fibers 12, 12' into the respective first V-grooves 20, 22.

The end faces 12E, 12E' of the fibers 12, 12' lie aligned with each other and are also positioned in confrontational relationship with the cleaved ends of the fixed fibers $F_1$, $F_2$.

To switch the fibers 12, 12', the actuator 64 is asserted, and the arm 72A of the switching member 62 engages the fiber 12. Since the grooves are spaced apart a distance substantially equal to the diameter D of the movable fibers 12, 12', as the fiber 12 begins a semicircular movement (FIG. 1F, FIG. 4) similar to that discussed above the first portion 12F of the first fiber 12 abuts against the second fiber 12' (see, FIG. 4A, 4B). This abutting action transmits the switching force to the second fiber 12' and causes the same to begins its semicircular motion. In this manner each fiber 12, 12' is moved into an adjacent groove. The displacement of the switching member 62 is again limited by the abutment arrangement 76 (FIG. 2B). Again it is noted that the abutment arrangement 76 needs to be only coarsely aligned inasmuch as precise alignment of the respective movable and fixed fibers is accomplished by the V-grooves.

Figure 3A:
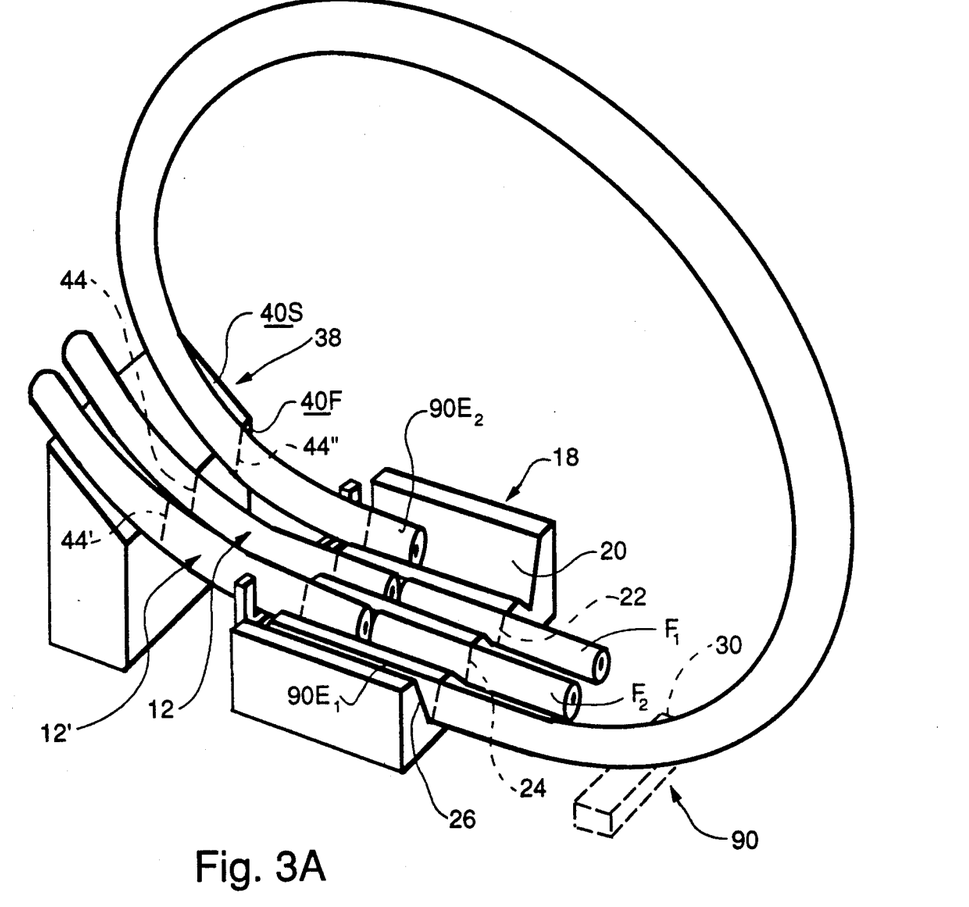
FIGS. 3A and 3B are view respectively similar to FIGS. 2A and 2B that illustrate the further extension of the principles of the switch in accordance with the present invention to a crossover switch arrangement for switching multiple optical fibers.
Figure 3B:
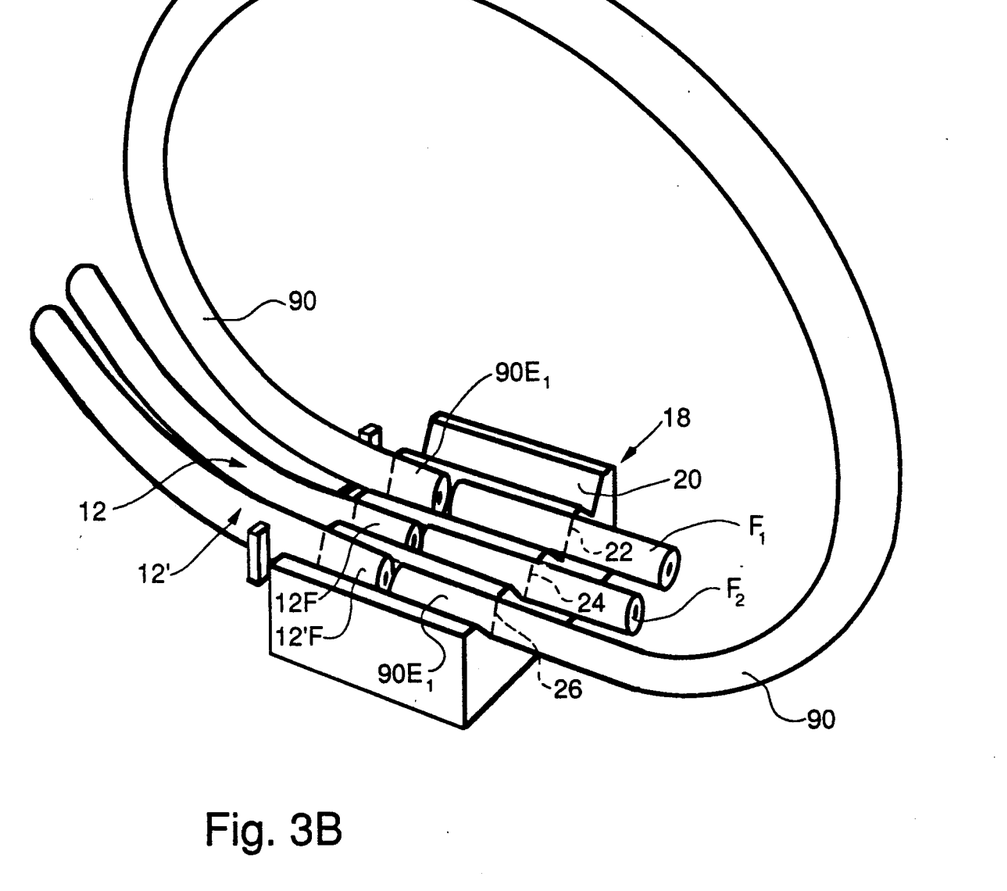

FIGS. 3A and 3B illustrate a yet further modification to the embodiment of FIGS. 1A and 1B. In the arrangement of FIG. 3A and 3B, the block 18 has four grooves 20, 22, 24, and 26. An additional crossover fiber 90 is disposed in a crossover switch configuration. A crossover switch configuration is useful to bypass an inoperative node in a network. One end $90E_1$ of the fiber 90 is secured into the groove 26, as by mounting the same to the block 30, such that the cleaved end face $90E_1$ thereof is in alignment with the end faces of the other stationary fibers $F_1$, $F_2$. The cleaved end face $90E_1$ may have an anti-reflection coating thereon.

The fiber 90 is looped and inclines over the ramp surface 40S, thereby imparting a bend thereto and generating a biasing force imposed on the end $90E_2$ thereof. A groove 44'' may be provided on the ramp surface 40S to receive the fiber 90. The portion of the fiber 90 near to the end $90E_2$ thereof, the fiber 12, and the fiber 12' move as a group from groove to groove, in a manner directly analagous to that plural movable fiber embodiment already discussed in connection with FIG. 2. The disposition of the group of fibers when moved to a switched state is illustrated in FIG. 3B.

Figure 4B:
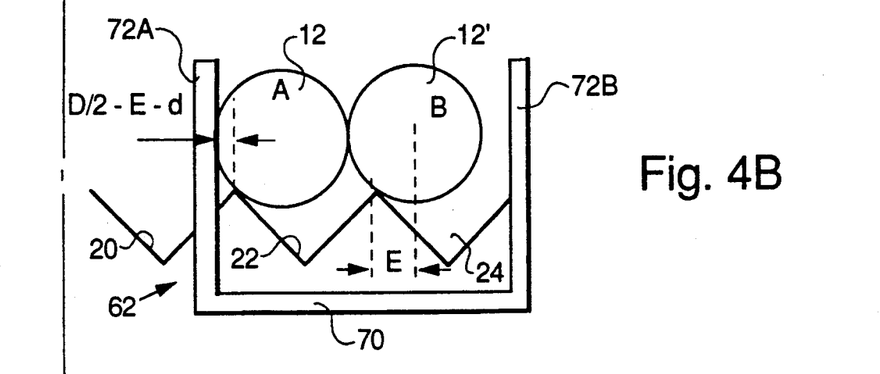
Figure 4C:
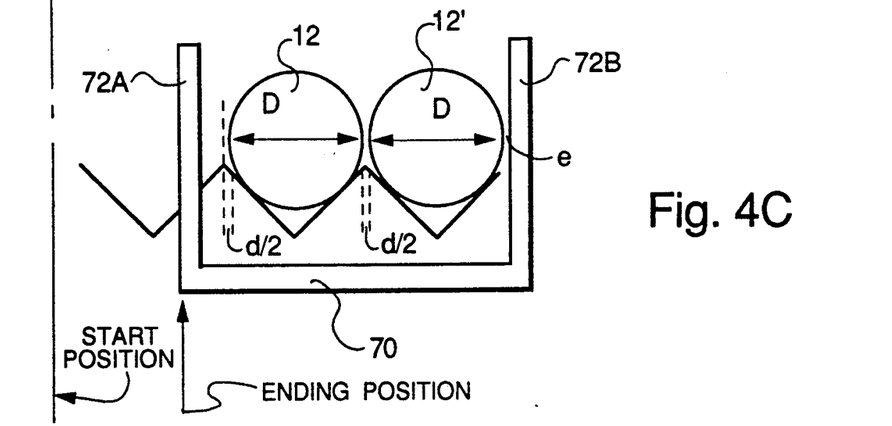

With reference now to FIGS. 4A through 4C, shown are diagrammatic illustrations of the considerations attendent upon the spacing 74 between the arms 72A, 72B of the yoke 62 and the distance of travel thereof. Consider two movable fibers 12, 12', each having a diameter D, arranged in a two fiber switching arrangement (FIGS. 2A and 2B). The distance 32 (FIG. 1C) between the axes of adjacent grooves is the distance D+d, where d is a small offset distance between the fibers 12, 12'.

TIn practice the fiber 12 must be pushed past the top of the adjacent groove by an amount E so that it will slide down the incline of the sidewall of the adjacent groove against friction. Adding all the length segments, it is clear that the minimum practical spacing 74 of the yoke 62 is given by the relationship:

Spacing $74 = 2.5 D + d/2 - E + 2e$.

The character "e" represents an additional increment since it is desired that the arms 72A, 72B not touch the fiber after the switching action is complete. However, it is aooarent that if precise control of the yoke motion can be attained, the absolute minimum spacing for the gap 74 is given by the relationship:

Absolute Minimum Spacing $74 = 2D + d + 2e$.

It is readily apparent that these teachings as to the minimum spacing distance 74 may be extended to switches employing more than two fibers.

The displacement distance of the yoke is indicated in FIG. 4. The starting and ending positions of the yoke are selected for reliable switching operation.

From the foregoing it is seen that FIG. 1 illustrates the manner in which a switch 10 in accordance herewith may be implemented in an on-off configuration or in a 1×2 configuration. Similarly the implementation of the switch of the present invention in a 2×2 configuration may be readily understood from FIG. 2. FIG. 3, as noted, illustrates a crossover bypass switch configuration. Extensions to other switch configurations should be readily apparent to those skilled in the art.

Figure 5A:
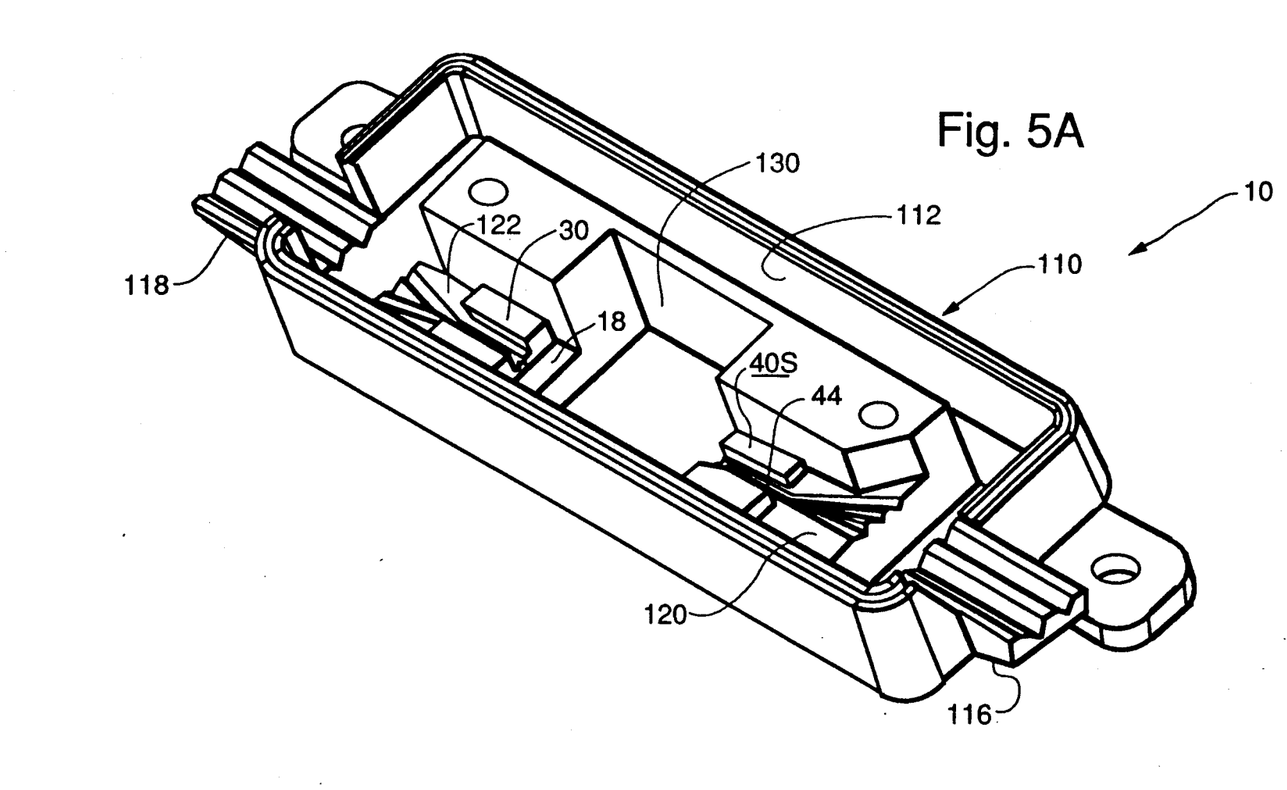
FIGS. 5A through 5C are, respectively, a perspective, plan and side sectional views of the structure of a practical implementation of a switch in accordance with this invention.
Figure 5B:
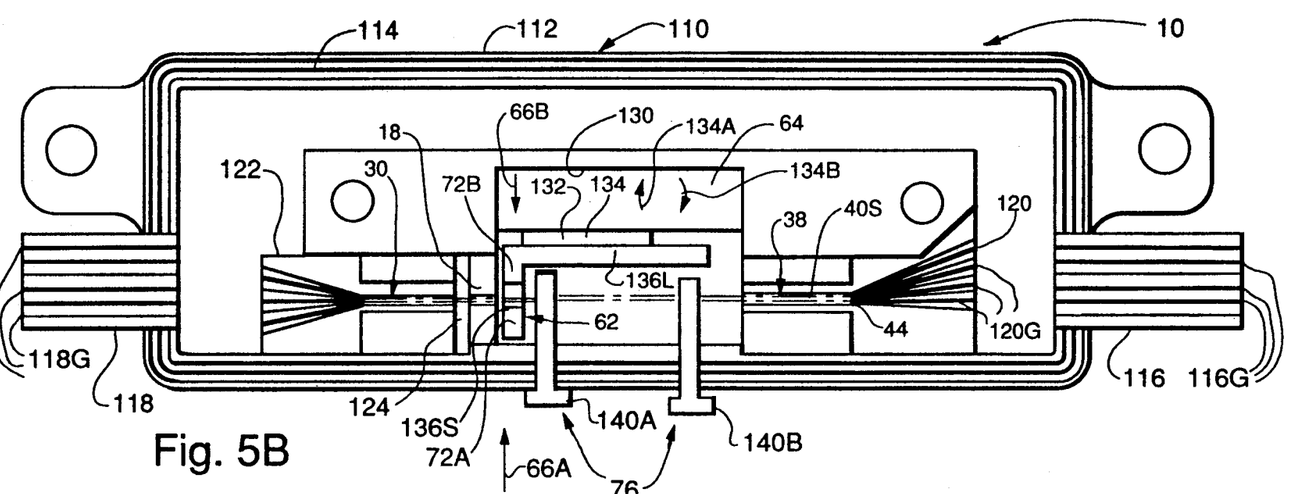
Figure 5C:
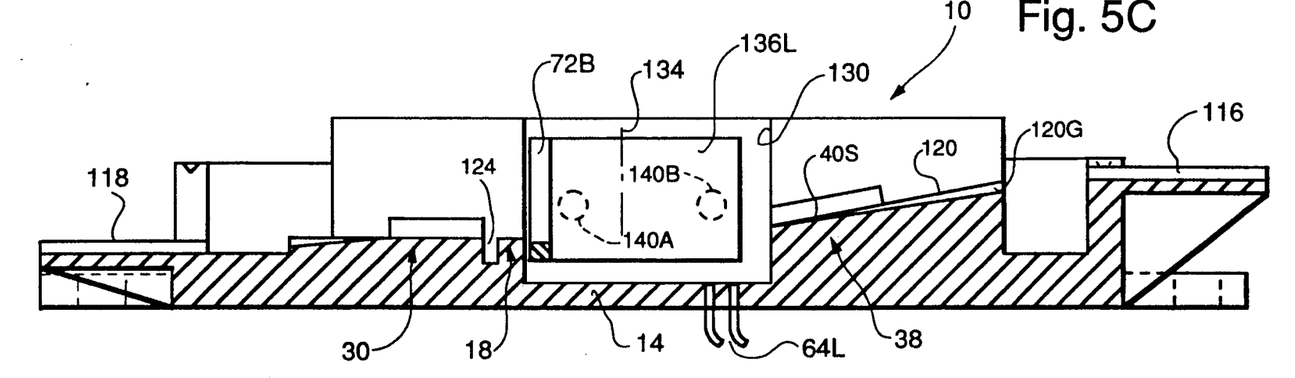

With reference now to FIGS. 5A, 5B and 5C, shown are perspective, plan and side sectional views of a practical implementation of a switch in accordance with the invention.

The above-discussed elements of the switch 10 are molded integrally within a housing generally indicated by the character 110 from a polyester engineering thermoplastic resin material such as that manufactured and sold by E. I. Du Pont de Nemours and sold under the trademark "Rynite". The housing 110 has an upstanding sidewall 112 that surrounds and encloses the base 14. The top of the sidewall 112 has a groove 114 that engages a bead provided in the undersurface of a cover (not shown). The cover 16 (not shown) is configured to close all open areas of the switch housing 110 shown in FIG. 5A, and thereby protects the interior of the switch. The cover is glued in place, using any suitable adhesive, such as the adhesive sold by Loctite Corporation, sold as product number 404. The blocks 18 and 30, the pedestal 38 and the other of the elements above described are integrally formed with the base 14.

The sidewall 112 is interrupted at opposed ends thereof by a first and a second fiber support shelf 116, 118, respectively. Each shelf is grooved, as at 116G, 118G, and respectively defines a support platform whereby the movable fibers 12, 12' and the fixed fibers $F_1$, $F_2$ may enter the switch housing 110. The fibers are glued to the shelves 116, 118 (e.g., using the last-mentioned adhesive) and a strain relief heat shrink tubing used thereover.

Since the movable fibers 12, 12' enter the housing 110 with their jackets in place a transition pedestal 120 is disposed adjacent to the pedestal 38. The transition pedestal 120 is grooved, as at 122G, with the grooves bending toward the inlets of the grooves 44 on the ramp surface 40S. The purpose of the transition pedestal 120 is to provide a space within the body of the switch 10 wherein the stripped fibers 12, 12' may be arranged prior to their introduction onto the ramp surface 40S. Since the fixed fibers $F_1$, $F_2$ also enter the housing with their jackets in place, a transition pedestal 122 adjacent to the support plate 118 serves a similar function for these fibers.

A gap 124 is defined between the block 30 and the block 18. This gap 124 prevents epoxy adhesive from flooding the grooved surface of the block 18.

A pocket 130 is formed on the interior of the housing 110. The actuator 64 (FIGS. 5B, 5C) is received in the pocket 130. The actuator 64 is preferably implemented using a solenoid actuator such as that manufactured by Aromat Corporation, New Providence, N.J. and sold as model TN2E-5V. Power is applied to the actuator 64 via leads 64L extending through openings formed in the base 14 (FIG. 5C). With particular reference to FIGS. 5B and 5C, the actuator 64 includes a bar 132 that is pivotally mounted on a rod 134. Energization of the coils of the actuator causes motion of the bar 132 in the opposed directions 134A, 134B.

Attached to the bar 132 is a generally L-shaped bracket 136. The long side 136L of the bracket 136 is attached to the bar 132 by any suitable means of attachment. The short leg 136S of the bracket 136 has a cutout that serves to define the yoke shaped switching member 62 illustrated in the other drawing Figures. The opposed reciprocating motions 134A, 134B of the bar 132, when transmited to the bracket 136, impart the generally transverse switching motions 66A, 66B of the switching member 62.

In the preferred instance the abutment arrangement 76 limiting the motion of the switching member 62 is defined by a pair of locating screws 140A, 140B. The screws 140A, 140B are threaded through the sidewall 112 of the housing 110, and act against the surface of the long arm 136L of the bracket 136. It should be understood that the adjustable screws 140A, 140B are provided to accommodate tolerances introduced during the manufacture of the switch. With tighter manufacturing control it may be possible to use fixed surfaces on the interior of the housing as the abutments surfaces.

Those skilled in the art, having the benefit of the teachings of the present invention as hereinabove set forth may effect numerous modifications thereto. It should be understood that such modifications are to be construed to lie within the contemplation of the present invention, as defined by the appended claims.

What is claimed is:

1. An optical fiber switch comprising:
a block having a first and a second groove, each groove having a bottom therein;
an inclined ramp disposed a predetermined distance from the block;
an optical fiber having an end face, a first portion of the fiber adjacent to the end face being disposed within a groove in the block, a second portion of the fiber being disposed on the inclined ramp such that the fiber undergoes a bending intermediate the block and the ramp, the bending of the fiber imparting a biasing force thereto,
the biasing force acting on the optical fiber in a direction such that the first portion of the fiber is urged toward the bottom of the groove in which it is disposed;
a switching member; and
means for displacing the switching member in a direction generally transverse to the biasing direction thereby to move the first portion of the fiber out of the one groove in which it is disposed and into the other groove, the biasing force acting upon the first portion of the fiber to urge that portion of the fiber toward the bottom of the other groove.

2. The optical fiber switch of claim 1 wherein
the inclined ramp is disposed a predetermined distance L from the grooved member,
the ramp is inclined at a predetermined angle B, and
the point whereat the fiber last contacts the inclined ramp lies a predetermined distance H above the bottom of the groove,
the first portion of the fiber thereby defining a predetermined positive angle A with respect to the bottom of the groove.

3. The optical fiber switch of claim 2 wherein the magnitude of the angle A is related to the angle B, the distance H and the distance L in accordance with the relationship:

$$A = B - 1.5(B - H/L).$$

4. The optical fiber switch of claim 1 wherein each groove has an axis therethrough, the grooves being disposed in side-by-side relationship with the axes thereof being substantially parallel.

5. The optical fiber switch of claim 4 wherein the fiber has a predetermined diameter, and wherein the axes of the grooves are spaced by a distance at least equal to the diameter of the fiber.

6. The optical fiber switch of claim 1 wherein the fiber has a predetermined diameter, and wherein the grooves have a depth dimension equal to at least one-half the diameter of the fiber.

7. The optical fiber switch of claim 1 further comprising a fixed optical fiber disposed in one of the grooves.

8. The optical fiber switch of claim 1 further comprising a second fixed optical fiber disposed in the other of the grooves.

9. An optical fiber switch comprising:
a block having a first, a second groove and a third groove, each groove having a bottom therein;
a first and a second output optical fiber, each output fiber having a face thereon and an axis therethrough, each output optical fiber being disposed in one of the grooves;
an inclined ramp disposed a predetermined distance from the block;
a first and a second input optical fiber, each input optical fiber having an end face, a first portion adjacent to the end face being disposed within a groove in the block and a second portion of the fiber being disposed on the inclined ramp such that each fiber undergoes a bending intermediate the block and the ramp, the bending of each fiber imparting a biasing force thereto,
the biasing force acting on each input optical fiber in a direction such that the first portion of each input optical fiber is urged toward the bottom of the groove in which it is disposed;
a switching member; and
means for displacing the switching member in a direction generally transverse to the biasing direction thereby to move the first portion of the first input optical fiber out of the one groove in which it is disposed and into abutting contact with the second input optical fiber, thereby to move the first portion of the second input optical fiber out of the groove in which it is disposed, the biasing force acting upon the first portion of each input optical fiber to urge that portion of each input optical fiber toward the bottom of another groove.

10. The optical fiber switch of claim 9 wherein the inclined ramp is disposed a predetermined distance L from the grooved member, the ramp is inclined at a predetermined angle B, and the point whereat each fiber last contacts the inclined ramp lies a predetermined distance H above the bottom of the grooves, the first portion of each fiber thereby defining a predetermined positive angle A with respect to the bottom of the groove.

11. The optical fiber switch of claim 10 wherein the magnitude of the angle A is related to the angle B, the distance H and the distance L in accordance with the relationship:

$$A = B - 1.5(B - H/L).$$

12. The optical fiber switch of claim 9 wherein each groove has an axis therethrough, the grooves being disposed in side-by-side relationship with the axes thereof being substantially parallel.

13. The optical fiber switch of claim 12 wherein the fiber has a predetermined diameter, and wherein the axes of the grooves are spaced by a distance at least equal to the diameter of the fiber.

14. The optical fiber switch of claim 9 wherein the fiber has a predetermined diameter, and wherein the grooves have a depth dimension equal to at least one-half the diameter of the fiber.

15. An optical fiber switch comprising:

a block having a first, a second groove, a third groove and a fourth groove, each groove having a bottom therein;

a crossover fiber having a first end and a second end thereon, the first end of the crossover fiber being disposed in the one of the grooves, a first and a second output optical fiber, each output fiber having a face thereon and an axis therethrough, each output optical fiber being disposed in adjacent ones of the grooves;

an inclined ramp disposed a predetermined distance from the block;

a first and a second input optical fiber, each input optical fiber having an end face, a first portion adjacent to the end face being disposed within a groove in the block and a second portion of the fiber being disposed on the inclined ramp such that each fiber undergoes a bending intermediate the block and the ramp, the bending of each fiber imparting a biasing force thereto, the second end of the crossover fiber being disposed in a groove in the block different from the groove in which the first end of the crossover fiber is disposed, a portion of the crossover fiber also being disposed on the inclined ramp such that each fiber undergoes a bending intermediate the block and the ramp, the bending of each fiber imparting a biasing force thereto, the biasing force acting on each input optical fiber and on the second end of the crossover fiber in a direction such that the first portion of each input optical fiber and the second end of the crossover fiber is urged toward the bottom of the groove in which it is disposed;

a switching member; and means for displacing the switching member in a direction generally transverse to the biasing direction thereby moving the second end of the crossover fiber out of the one groove in which it is disposed and into abutting contact with the first input optical fiber and moving the first portion of the first input optical fiber out of the one groove in which it is disposed and into abutting contact with the second input optical fiber thereby to move the first portion of the second input optical fiber out of the groove in which it is disposed, the biasing force acting upon the second end of the crossover fiber and on the first portion of each input optical fiber to urge that portion of each input optical fiber and the second end of the crossover fiber toward the bottom of another groove.

16. The optical fiber switch of claim 15 wherein the inclined ramp is disposed a predetermined distance L from the grooved member, the ramp is inclined at a predetermined angle B, and the point whereat each fiber last contacts the inclined ramp lies a predetermined distance H above the bottom of the grooves, the first portion of each fiber thereby defining a predetermined positive angle A with respect to the bottom of the groove.

17. The optical fiber switch of claim 16 wherein the magnitude of the angle A is related to the angle B, the distance H and the distance L in accordance with the relationship:

$$A = B - 1.5(B - H/L).$$

18. The optical fiber switch of claim 15 wherein each groove has an axis therethrough, the grooves being disposed in side-by-side relationship with the axes thereof being substantially parallel.

19. The optical fiber switch of claim 18 wherein the fiber has a predetermined diameter, and wherein the axes of the grooves are spaced by a distance at least equal to the diameter of the fiber.

20. The optical fiber switch of claim 15 wherein the fiber has a predetermined diameter, and wherein the grooves have a depth dimension equal to at least one-half the diameter of the fiber.

* * * * *